United States Patent [19]
Lee et al.

[11] Patent Number: 5,382,396
[45] Date of Patent: Jan. 17, 1995

[54] METHOD OF MAKING A POROUS CERAMIC FILTER

[75] Inventors: Chun-Sho Lee, Taichung; Ai-kang Li, Hsinchu, both of Taiwan, Prov. of China

[73] Assignee: Industrial Technology Research Institute, Hsinchu, Taiwan, Prov. of China

[21] Appl. No.: 898,302

[22] Filed: Jun. 15, 1992

[51] Int. Cl.$^6$ ............................................. C04B 35/65
[52] U.S. Cl. .......................................... 264/44; 264/63; 264/65; 264/66; 264/82
[58] Field of Search ................... 264/44, 65, 63, 66, 264/82, 83

[56] References Cited

U.S. PATENT DOCUMENTS

| | | | |
|---|---|---|---|
| 3,468,992 | 9/1969 | Lubatti et al. | 264/65 |
| 3,669,723 | 6/1972 | Parr et al. | 264/59 X |
| 4,125,592 | 11/1978 | Ezis et al. | 264/65 X |
| 4,687,655 | 8/1987 | Hunold et al. | 264/65 X |
| 4,774,217 | 9/1988 | Takeuchi et al. | |
| 4,981,820 | 1/1991 | Renlund et al. | 264/44 X |
| 5,053,092 | 10/1991 | Lachman | 264/60 X |
| 5,093,289 | 3/1992 | Braetsch et al. | 264/59 X |
| 5,098,623 | 3/1992 | Pompe | 264/65 |
| 5,141,683 | 8/1992 | Hyndman et al. | 264/44 |

FOREIGN PATENT DOCUMENTS

| | | |
|---|---|---|
| 3835807 | 3/1989 | Germany . |
| 3905080 | 11/1989 | Germany . |
| 57-107215 | 7/1982 | Japan . |
| 01-280021 | 11/1989 | Japan . |
| 1004352 | 9/1965 | United Kingdom . |
| 1114385 | 5/1968 | United Kingdom ............ 264/44 |
| 2105316 | 3/1983 | United Kingdom . |
| WO88/00933 | 2/1988 | WIPO . |

OTHER PUBLICATIONS

"Manufacture and Application of Highly Porous NonOxide Ceramics", pp. 468-470, 472, Ceramic Forum International, V. Braetsch et al., 1989.

*Primary Examiner*—Karen Aftergut
*Attorney, Agent, or Firm*—Fish & Richardson

[57] ABSTRACT

A process for manufacturing a porous $Si_3N_4$ ceramic filter, wherein silicon powder, the raw material, methyl cellulose, the binding agent, and water, the solvent, are well-mixed together to obtain a slurry. A sponge is then dipped into the slurry to adsorb the slurry. After drying the sponge in an oven, it is biscuit fired at 350° C. for 2 hours, and then sintered at 1200–1400° C. for 15 hours.

6 Claims, 2 Drawing Sheets

METHOD OF MAKING A POROUS CERAMIC FILTER

BACKGROUND OF THE INVENTION

The present invention relates to a process for manufacturing a porous ceramic filter using silicon powder as a raw material and methyl cellulose as a binding agent.

In general, a porous ceramic filter can be used in metallic smelting processes to filter off impurities in molten metals. In the past, the material used for making ceramic filters was aluminium oxide, but it is only suitable for filtering molten aluminium alloys due to its low resistance to heat. If $Si_3N_4$ (silicon nitride) is used as a raw material, the thermal shock resistance of the ceramic filter produced is three times that of filters using aluminium oxide, therefore, a $Si_3N_4$ ceramic filter can be utilized in stainless steel or superalloy processes with operating temperatures higher than 1400° C.

PCT No: WO 88/00933 discloses a method for fabricating a porous ceramic filter with silicon powder combined with silicon dioxide as a starting material. After injection molding or extrusion molding, the organic additives in the material are burnt off at 800° C., then the ceramic composition is nitrided to silicon nitride. However, the process is complicated since several kinds of organic compounds are added and high temperatures (e.g. 800° C.) are required to totally burn off the additives.

German Patent Publication No. DE 38 35 807 uses silicon nitride as starting material, and adds aluminium oxide, yttrium oxide, silicon oxide, titanium dioxide, magnesium oxide, zirconium oxide and chromium oxide as sintering agents. After a ceramic slurry is readily prepared, it is adsorbed to a foamed polymer to form green ware. Finally, the green ware is dried and sintered at 1500°–1800° C.

In German Patent Publication No. DE 39 05 080 a slurry is adsorbed to a foamed organic material, such as polyurethane foam, with adsorption thickness of 0.5–3 mm, then it is subjected to a sintering process.

In Japanese Patent Publication No. JP 01 280021 a ceramic composition including aluminium oxide, yttrium oxide, magnesium oxide, silicon oxide and silicon nitride is biscuit fired at 500°–900° C., and sintered at 1400°–1900° C.

Japan Laid Open No:82-10-7215 discloses a composite ceramic including aluminium oxide, cordierite, silicon carbide and silicon nitride, and the ceramic product is used for filtering the carbon powder in the air.

Besides silicon nitride, zirconium oxide can also be used as a material for producing porous ceramic filter that are resistant to temperatures greater than 1400° C. However, the price of zirconium oxide is much higher than that of silicon powder.

SUMMARY OF THE INVENTION

It is therefore an object of the present invention to provide a process for sintering a porous ceramic filter that can be used in processes operating at temperatures higher than 1400° C.

It is another object of the present invention to provide a process for manufacturing a porous $Si_3N_4$ ceramic filter using silicon powder, which is three times less expensive than silicon nitride, as the starting material.

According to the present invention, a ceramic slurry is prepared using silicon powder as the raw material, water as the solvent, and methyl cellulose as the binding agent. Subsequently, the slurry is adsorbed onto a sponge made of thermal plastic material. The sponge is biscuit fired by heating to 350° C. to remove the organic components, such as the C—C and C—H bonds, in the ceramic composition. The porous body is then sintered at 1200°–1400° C. to produce a porous ceramic filter.

DETAILED DESCRIPTION OF THE INVENTION

Figure 1:
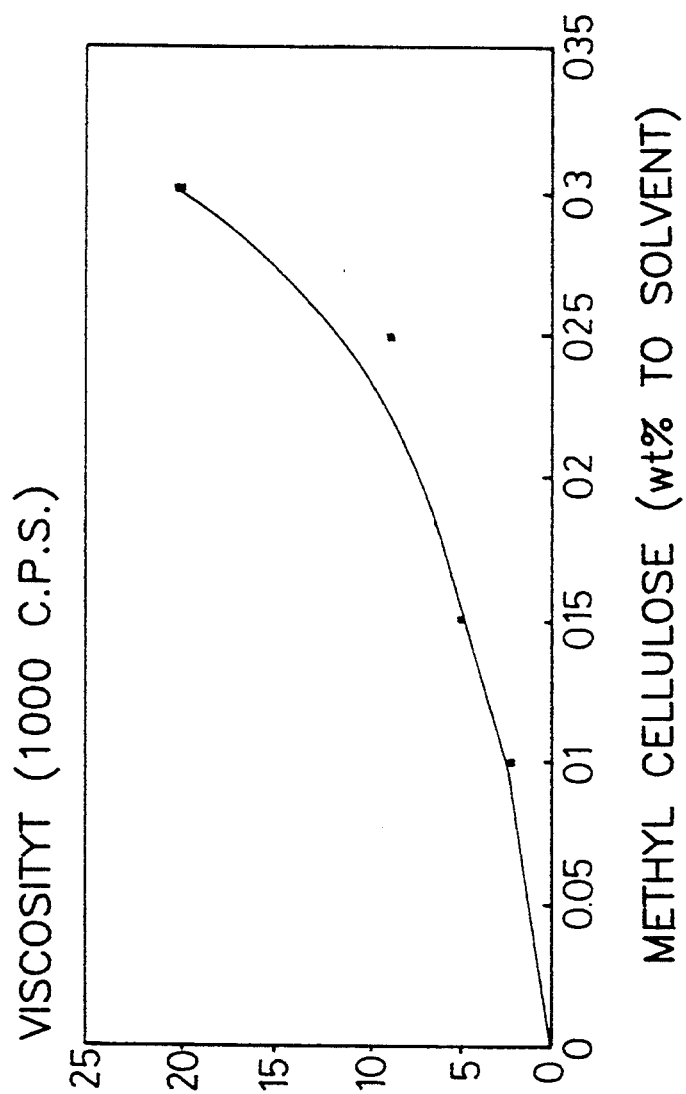
Figure 2:
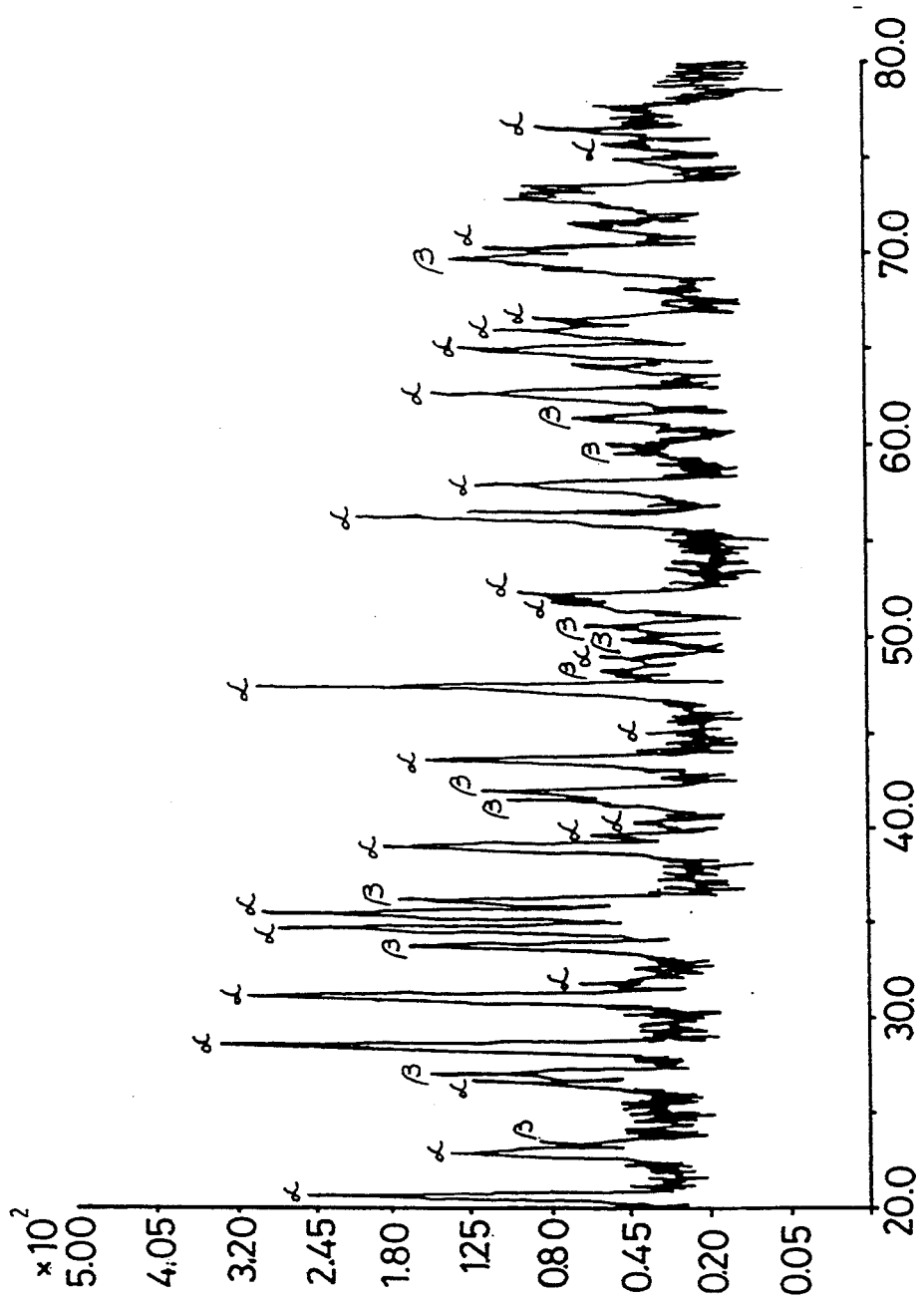

The objectives, features, and advantages of the present invention can be better understood from the following examples and accompanying figures, wherein:

FIG. 1 is a graph of the amount of methyl cellulose added vs. slurry viscosity of the porous $Si_3N_4$ ceramic filter in Example 1; and FIG. 2 is an XRD spectrogram of the porous $Si_3N_4$ ceramic filter in Example 1.

Example 1

Silicone powder is well-mixed with a suitable amount of water (66.7 wt % dry solid), and 0.3 wt % (relative to the weight of water) of methyl cellulose to obtain a slurry with viscosity of about 20,000 c.p.s. (FIG. 1).

A sponge is dipped into the slurry so that the slurry is adsorbed into the sponge. After taking out the sponge, the slurry in the gaps of the sponge is squeezed out using a roller. Then, the sponge is dried in an oven for 20 hours at 55° C.

The sponge is fired in a biscuit furnace by raising the temperature from 100° C. to 350° C. at a rate of 2° C./min. The temperature is maintained at 350° C. for 2 hours, then lowered at a rate of 10° C./min. The composite ceramic is sintered in a nitriding furnace, where the temperature is raised to 1250° C. at a rate of 30° C./min. After 5 hours, the temperature is raised to 1350° C. and kept at that temperature for 10 hours.

The XRD spectrogram of the porous ceramic filter thus produced after the 15 hours sintering process is shown in FIG. 2, wherein $\alpha$ (low-temperature form) denotes the alpha-form and $\beta$ (high-temperature form) denotes the beta-form of $Si_3N_4$. It can be seen from FIG. 2 that no silicon remains in the $Si_3N_4$ ceramic filter since the nitrition of silicon powder into $Si_3N_4$ is complete. Furthermore, the purity the $Si_3N_4$ ceramic filter is almost 99%, and hardly any shrinkage of the filter can be found after the sintering process.

While the preferred embodiment has been described, variations thereto will occur to those skilled in the art within the scope of the present inventive concepts which are delineated by the following claims.

What is claimed is:

1. A process for manufacturing a porous $Si_3N_4$ ceramic filter comprising:
   mixing silicon powder, water and methyl cellulose to obtain a slurry,
   dipping a sponge into the slurry so that the slurry is adsorbed to the sponge,
   drying the sponge,
   biscuit firing the sponge, and
   sintering the sponge in a nitriding furnace for about 15 hours at temperature in a range of 1200°–1400° C. to form the porous $Si_3N_4$ ceramic filter.

2. A process as claimed in claim 1, wherein the slurry is 65–70 weight percent in dry solid content the silicon powder, and 0.25 to 0.3 weight percent of the methyl cellulose based on a total weight of the water.

3. A process as claimed in claim 1, wherein the sponge is made of thermal plastic material.

4. A process as claimed in claim 1, wherein the sponge is dried in an oven at 55° C. for 20 hours.

5. A process as claimed in claim 1, wherein the sponge is biscuit fired at a temperature of 350° C. for 2 hours.

6. A process as claimed in claim 1, wherein the sponge is sintered in the nitriding furnace at 1250° C. for 5 hours, and at 1350° C. for 10 hours.

* * * * *